United States Patent

[11] 3,618,781

| [72] | Inventor | Carl A. Brown<br>Birmingham, Mich. |
| --- | --- | --- |
| [21] | Appl. No. | 852,261 |
| [22] | Filed | Aug. 22, 1969 |
| [45] | Patented | Nov. 9, 1971 |
| [73] | Assignee | Parker-Hannifin Corporation<br>Cleveland, Ohio |

[54] DUPLEX FILTERING DEVICE
10 Claims, 6 Drawing Figs.

[52] U.S. Cl. .................................................. 210/341,
137/545
[51] Int. Cl. ....................................................... B01d 35/12
[50] Field of Search ........................................... 210/340,
341; 137/545, 630.17, 625.32, 625.47

[56] References Cited
UNITED STATES PATENTS

| 1,288,257 | 12/1918 | Stewart ........................ | 210/341 X |
| --- | --- | --- | --- |
| 1,721,233 | 7/1929 | Royle ........................... | 210/341 |
| 2,681,736 | 6/1954 | Voorheis ....................... | 210/341 |

Primary Examiner—Frank A. Spear, Jr.
Attorney—Hauke, Gifford & Patalidis

ABSTRACT: A duplex filtering device having an inlet port and an outlet port provided with a pair of chambers separated by a common partition, each chamber having a filter element with an inlet and an outlet passageway respectively adapted to be connected to the inlet and the outlet ports of the filtering device. A valve member is disposed at each end of the partition, one of the valve members being adapted to be rotatably shifted from a first position for connecting one of the inlet passageways to the inlet port and to a second position for connecting the other inlet passageway to the inlet port, while the other of the valve members is adapted to be rotatably shifted from a first position for connecting one of the outlet passageways to the outlet port, and to a second position for connecting the other outlet passageway to the outlet port; the pair of valve members being connected to each other for simultaneous movement by means of a universal link extending through the common partition. A third valve carried within the device fluidly connects the two chambers to balance the pressure therein so as to permit shifting of the pair of valve members between their first and second positions.

INVENTOR
CARL A. BROWN

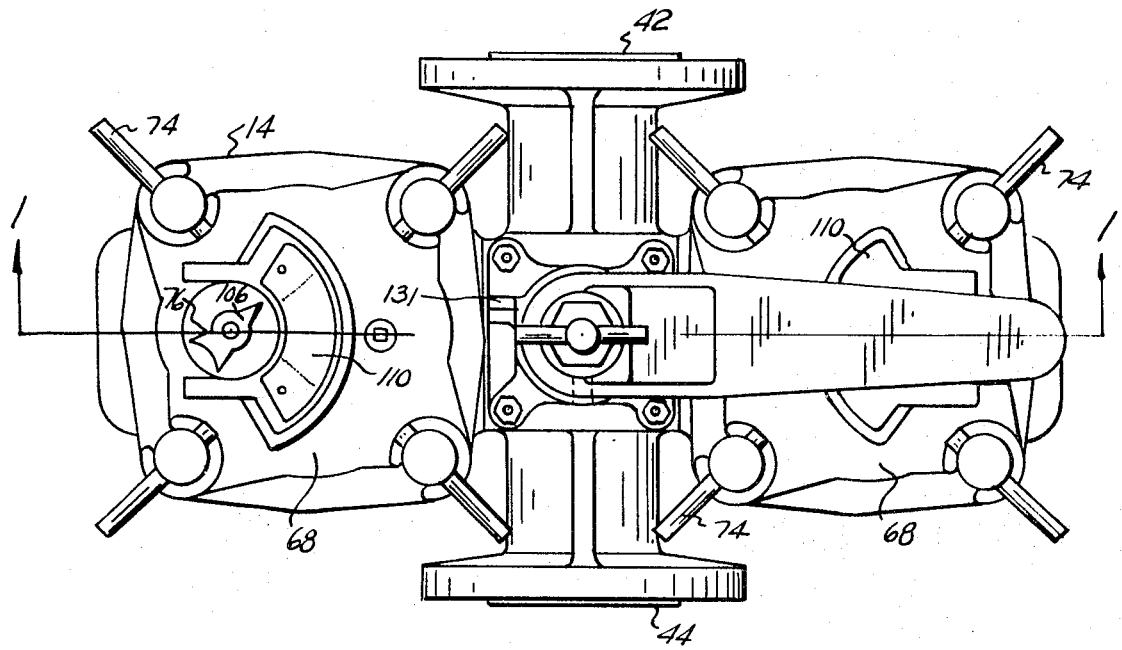
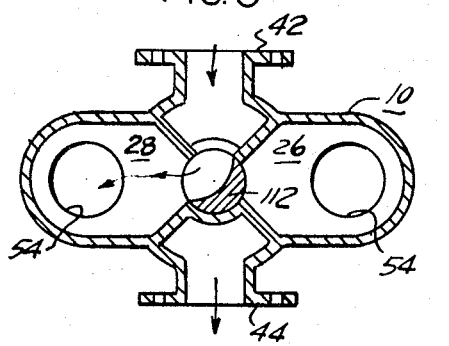
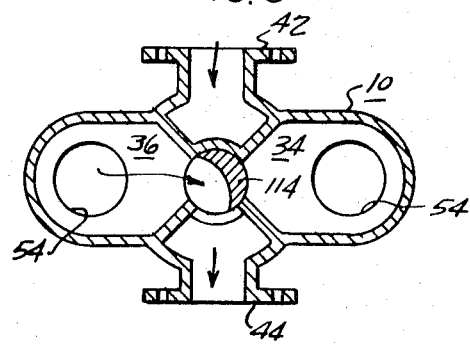
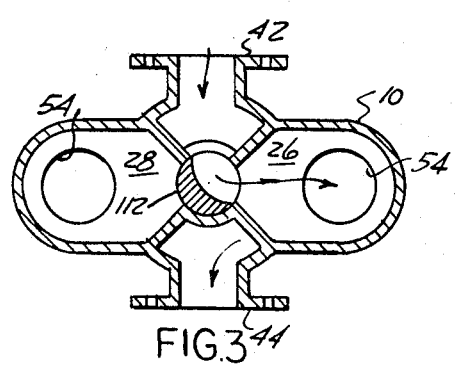
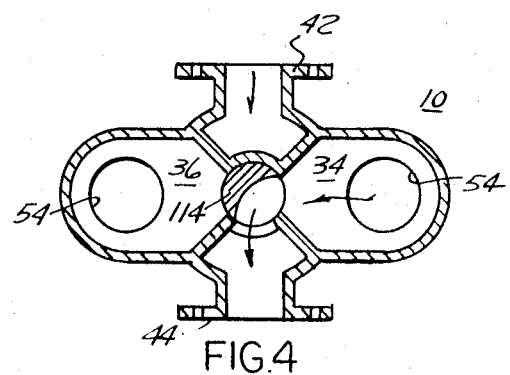

DUPLEX FILTERING DEVICE

BACKGROUND OF THE INVENTION

1. Field of the Invention

This invention relates to filtering devices, and particularly to an improvement in duplex filtering devices of the type comprising a pair of filter elements so arranged that the flow of liquid to be filtered can be changed from one element to the other so that as one element is brought into service the other is automatically withdrawn from service.

2. Description of the Prior Art

A number of duplex filtering devices have been disclosed in the prior art which have had as their objective a structure which permits the separation of a clogged filter element from a fluid system without prolonged interruption in the continuity of the fluid flow. Such duplex filter devices are generally utilized as an integrally installed portion of a continuously operating liquid line so that one filter element of the device operates while the other filter element is idle. The idle filter element is then available for cleaning or replacement while the other filter element is in operation. When the operating filter element becomes substantially clogged, or just prior thereto, the device is operated in such a way that the previously cleaned idle filter element is positioned in the fluid line while the operating filter element is removed from functioning, and is then available to be cleaned or replaced. In this way, the fluid flow can continue uninterrupted while the clogged filter element is available for cleaning periodically.

Heretofore, duplex filter devices consisted of an inlet chamber, an outlet chamber, a pair of filtering compartments, connecting passageways and suitable valve means and actuating mechanisms therefore, by means of which fluid circulation could be established from the inlet to outlet through any one of the filter elements, while the other is taken out of service as for replacement or cleaning purposes. In such devices, the compartments are separated by a common partition, which generally has a pair of plug-type switching valve members which are adapted to selectively connect the outlet and inlet chambers to one of the filter elements while simultaneously disconnecting the other filter element from the inlet and outlet chambers of the device. The valves which are generally of the plug type and axially movable within the partition member, are connected to each other by means of a valve shaft. Since they are movable together as an integral unit, errors in timing and/or sequence or extent of opening or closing of any port relative to other ports are not possible.

In many applications, the pressure of the liquid is not particularly high and no special problems arise with the use of such valve members for selectively connecting the device's inlet and outlet chambers to the clean filter element. A difficulty does arise in providing a duplex filtering device which is operable in relatively high pressure lines and especially in lines of considerable size. In the prior art devices, during normal operation, fluid pressure in the working chamber generally exerts a force against the switching valve members which makes it extremely difficult to shift the valve members so as to divert the fluid flow from one chamber to the idle chamber. Therefore, it would be very desirable to provide a duplex filtering device in which the pressure between the two filter chambers can be balanced, when switching from one chamber to the other is desired.

As herebefore mentioned it is also common in such devices to have a common shaft connecting the upper and lower switching valve members so that the two can be simultaneously switched to prevent errors in timing, etc. Such a common shaft between the two valve members necessitates concentric bores and adequate sealing means between the same so as to prevent fluid flow directly from the inlet chamber to the outlet chamber and the resultant contamination of fluid which has passed through the filter element. The provision of concentric bores adds to the overall cost of such filter devices and if acceptable tolerances are exceeded during the manufacturing process, the seals on the common shaft connecting the upper and lower valve members can become worn in a relatively short time leading to undesirable fluid communication between the inlet and outlet, that is, the filter element will be bypassed. It would therefore be desirable to have a duplex filtering element having upper and lower switching valve members operable on a common valve shaft, yet one which does not require a concentric mounting bore for the shaft and switching valve members.

SUMMARY OF THE INVENTION

The present invention, which will be described in more detail hereinafter, comprises a duplex filtering device adapted to be installed in a fluid line, having means for diverting the incoming fluid to either of two filtering chambers, and discharging filtered fluid from such chambers through an outlet port. There is provided a valving means to isolate whichever one of the filter chambers is not being utilized and a pilot valve so that pressure within the dual filter device can be balanced between the duplex filter chambers to permit ready manual movement of the valving means. A filter element is disposed in each of the filter chambers with the chambers being separated by a common partition having a bore extending therethrough and having valving surfaces formed on opposite ends thereof. Axially aligned valve members are disposed at opposite ends of the partition bore and slidably engage the valving surface for rotatable movement from a first position to a second position for alternate connection and disconnection of the filter chambers with the filtering device's inlet and outlet. That is, one of the valve members is adapted to be shifted from a first position wherein fluid communication between the housing inlet and the inlet passageway to one of the chambers is established to a second position wherein fluid communication between the housing inlet and the inlet passageway of the other chamber is established, and the other valve member is adapted to be shifted from a first position providing a fluid connection of the housing outlet to the outlet passageway of one of the chambers to a second position for providing a fluid connection of the housing outlet to the outlet passageway of the other chamber. The valve members are driven by a shaft which extends through the filtering device housing and engages one of the valve members. A universal link extending through the partition bore connects the two valve members such that the valve members are shifted simultaneously while the universal link compensates for axial misalignment between the valve members as they engage their associated valving surfaces at the opposite ends of the partition bore. Suitable sealing means is provided within the partition bore to prevent the passage of fluid between opposite ends of the partition bore.

During normal operation the fluid within the operating filter chamber exerts a force against the valve members exposed thereto to urge the same into a fluid sealing engagement with their associated valving surfaces so as to prevent fluid communication between the two filter chambers. A manually operated pilot valve is provided to connect the two chambers with each other so as to balance the pressure on opposite sides of the valve members thereby permitting an operator of the device to shift the direction of fluid flow from one filter chamber to the other in a relatively easy manner and without exerting a substantial effort, which would be necessary if a force unbalance existed across the switching valve members.

DESCRIPTION OF THE DRAWINGS

The several objects, advantages and applications of the present invention will become apparent to those skilled in the art when the accompanying description of an example of the best mode contemplated for practicing the invention is read in conjunction with the accompanying drawings wherein like reference numerals refer to like or equivalent parts and in which:

FIG. 2 is a plan view of the duplex filtering device illustrated in FIG. 1;

FIG. 3 is a diagrammatic transverse sectional view of the duplex filtering device taken along line 3—3 in FIG. 1;

FIG. 4 is a diagrammatic transverse sectional view of the duplex filtering device taken along line 4—4 in FIG. 1;

FIG. 5 is a diagrammatic view similar to FIG. 3 but with the valve member rotated 180°; and FIG. 6 is a diagrammatic view similar to FIG. 4 with the valve member rotated 180°.

DESCRIPTION OF THE PREFERRED EMBODIMENT

Figure 1:
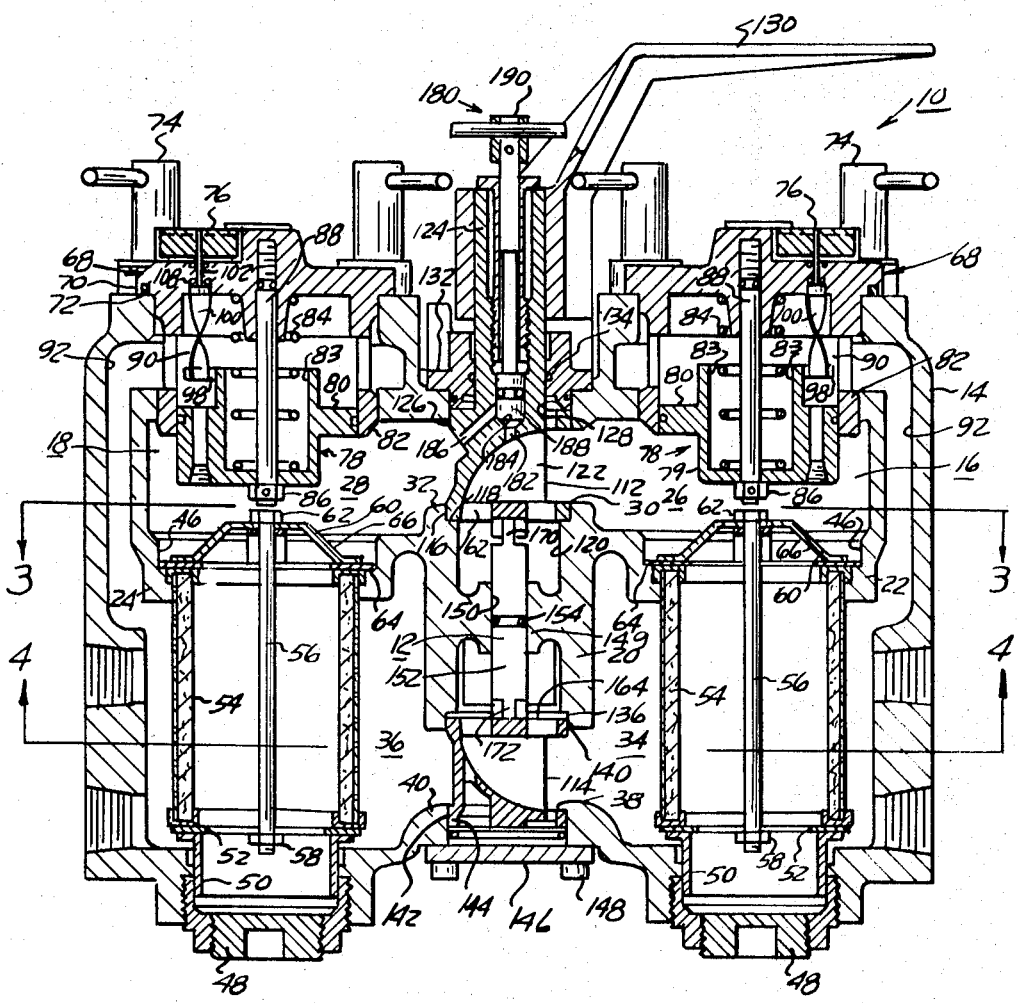
FIG. 1 is a longitudinal sectional view through a duplex filtering device illustrating an example of a preferred form of the present invention and taken along line 1—1 of FIG. 2.

Referring to the drawings, and especially to FIG. 1, a duplex filtering device 10, with its operating valve assembly 12, is shown in position to direct the flow of fluid being filtered through the right-hand filter. Since the present invention relates primarily to the valve assembly 12, one side only of the filter device will be described in detail as illustrative of both sides as the two filter elements are the same. The duplex filtering device 10 comprises a housing 14, which has a filter chamber 16 to the right and filter chamber 18 to the left. The left- and right-hand filter chambers are separated by a common partition 20, which houses the operating valve assembly 12, and which will be described in greater detail hereinafter. Each of the filter chambers 16, 18 is respectively provided with partition members 22, 24 which separate the filter chambers into upper sections 26, 28 each of which has transverse inlet passageways 30, 32 and lower sections 34, 36 each of which has transverse outlet passageways 38, 40.

The valve assembly 12 is adapted to connect the inlet passageways 30, 32 to a flanged inlet port 42, while the outlet passageways 38, 40 are adapted to be connected to a flanged outlet port 44 in a manner to be described in more detail hereinafter.

Each of the partition members 22, 24 is provided with a bore 46 which permits fluid communication between the upper and lower sections of each of the filter chambers.

A plug member 48 disposed at the bottom of each filter chamber has a cylindrically shaped support member 50 attached thereto and extending into the lower portion of the lower section of each filter chamber. An apertured ring 52 is attached to the ends of the support member by any suitable means, such as welding and the like. A conventional cylindrical filter element 54, having a sidewall formed of a suitable porous filtering material, is supported on the upper surface of the apertured ring 52. An elongated vertical rod 56, having its lower end fixed to the apertured ring 52 by any suitable means, such as bolt 58, extends axially upwardly through the center of the filter element 54 and is attached to a locking member 60 by means of bolt 62. The locking member 60 abuts the top of the filter element 54 and a recess 64 formed within the partition members 22, 24 and retains the filter element securely in place during operation. The outer portion of the locking member 60 is maintained in a fluid sealing engagement with the recess 64 when the bolt 62 is secured to the rod 56. A plurality of spaced-apart bores 66 formed within the locking member 60 provide a path for fluid flowing from the upper sections 26, 28 into the interior of the filter element 54 and then radially outwardly into the lower sections 34, 36.

Each of the filter chambers is provided with a cap 68 which closes off the upper end of the filter chamber and which has an annular flange 70 seated on the upper surface of the housing 14. An annular seal 72, carried by the cap 68, abuts the upper surface of the housing 14 so as to provide a fluid tight seal. The cap 68 is locked in place by a plurality of handles 74 which are threaded through the cap 68 and into the housing 14. The cap 68 also supports a visual indicating means 76, the operation of which will be described in greater detail hereinafter.

A bypass assembly 78 is carried within the lower section of the cap 68 and comprises a generally cylindrical valve 79. A flanged section 80 extending therefrom forms a sliding fluid sealing engagement with a cup-shaped section 82 extending from the lower portion of the cap 68. The flange section 80 of the valve 79 closes fluid communication between the upper and lower portions of the assembly 78. A cup-shaped section 83 of the assembly 78 functions as a seat for the lower end of a cylindrical spring member 84, which biases the entire assembly downward into abutment with a bolt head 86. The bolt head 86 is formed on the end of a second guide rod 88, which extends axially upward through the bypass assembly 78 and is threaded into the cap 68. The space 90 between the upper portion of the bypass assembly 78 and the lower portion of the cap 68 is connected to the lower sections 34, 36 of the filter chambers by means of a passageway 92 extending axially through the housing 14. The cylindrical bypass valve 79 is movable upwardly in response to the net pressure force acting against the lower surface and the opposing bias of the spring 84. For example, in normal operation with the valve assembly 12 connected as illustrated in FIG. 1, fluid enters the filter chamber 16 by means of the inlet passageway 30, flows through the apertured locking member 60 into the interior of the filter element 54 radially outward therethrough and into the lower section 34 and out through the outlet passage 38. When the filter element 54 becomes clogged to such an extent that the pressure within the upper section 26 is great enough to overcome the biasing force of the spring 84, bypass valve 79 is moved upwardly until the flange 80 passes up beyond the apertured section 94 formed within the section 82 of the cap 68. At this point, fluid within the upper section 26 is communicated to the lower section 34 by means of the housing passageway 92 and thereby bypasses the clogged filter element 54.

The upward axial movement of the bypass valve 79 is indicated by the indicator means 76 carried by the cap 68. A slotted arm member 98, carried at the upper end of the bypass valve 79, engages an actuator member 100, which is supported for rotation by a pin 102. The actuator member 100 comprises an elongated flat strip having a uniform longitudinal twist so that the linear axial movement of the arm member 98 rotates the pin 102. The pin 102 is supported for rotation in the cap 68 with its upper end extending above the surface of the cap 68 and supporting a pointer member 106 (FIG. 2). Seal members 108 provide a fluidtight seal between the pin 102 and the cap 68. A plate 110 is provided with suitable indicia to provide the operator with a visual indication of whether or not the filter element 54 requires cleaning or replacement.

For controlling and directing the flow of the fluid to be filtered through the filter element 54 in either of the filter chambers 16, 18, the valve assembly 12 comprises two valve members: an upper valve member 112 and a lower valve member 114. The upper member 112 has a valving surface 116 which coacts with a complementary valve seat 118, which takes the form of a shoulder formed at the upper end of a bore 120 extending axially through the partition 20. The valving surface 116 is slidably disposed within the valve seat 118 in a fluid-sealing engagement. The valve member 112 has a curved passageway 122 which selectively communicates the inlet passageways 30, 32 to the upper end of the partition bore 120. The upper end of the partition bore 120 is connected to an inlet port 42 through passageways extending radially outward from the bore 120. The valve passageway 122 may be selectively connected to either the inlet passage 30 of the upper section 26 of the chamber 16 or the inlet passage 32 of the upper section 28 of the chamber 18 by rotating the valve member 112 within the valve seat 118 until the valve passageway 122 communicates with one of the inlet passageways. A tubular extension 124 formed integrally on the upper portion of the valve member 112 extends upwardly and outwardly from the filtering device and has an annular portion 126 which engages the sidewalls of a bore 128 formed in the upper portion of the housing 14 and is adapted for a sliding fluid sealing engagement in the same manner as the valving surface 116 engages the valve seat 118. Rotational movement of the valve member 112 is obtained by means of a handle 130 which is carried around the outer periphery of the tubular extension 124 and which is connected thereto by any suitable means. A pair of positive stop members, one of which is illustrated at 131 in FIG. 2, permits 180° movement of the handle 130 and insures that the valve assembly 12 is properly positioned to direct the flow of fluid to either of the filter chambers 16, 18. A cap 132, disposed around the tubular extension 124, closes off the upper portion of the housing and the bore 128. O-ring type seals 134 are placed between the cap, the housing and the tubular member to prevent the passage of fluid thereby.

The lower valve member 114 is similar to the upper valve member 112, in that it is disposed for rotary movement within the lower end of the partition bore 120. A valve seat 136 formed within the bore 120 is adapted to receive a valving surface 140 of the lower valve member 114, in the same manner as hereinbefore described, with respect to the upper valve member 112. The lower portion of the lower valve member 114 is provided with a valve surface 142, disposed within a complementary valve seat 144 in a fluid-sealing relationship. The valve seat 144 is formed within the inner portion of a bore extending through the housing 14 and is sealed by means of a cap 146 retained thereto by bolts 148 or the like.

The upper and lower ends of the partition bore 120 are separated by means of an annular section 149 having a bore 150 of a lesser diameter than the partition bore 120 and extends axially through the center of the partition. The upper and lower valve members 112, 114 are adapted to be driven simultaneously by means of a valve shaft 152 extending through the decreased diameter bore 150. O-ring seal 154 disposed within a peripheral groove formed about the valve shaft 152 prevents a fluid communication between the upper and lower end of the partition bore 120. The lower section of the upper valve member 112 and the upper section of the lower valve member 114 are each provided with a plurality of spaced apertures respectively indicated by the numerals 162, 164, which permit fluid flow from the partition bore 120 and into the valve members. The lower valve member 114 is adapted to selectively connect the outlet passageways 38, 40 and their associated lower sections 34, 36 to the outlet port 44 which is connected axially to the lower end of the partition bore 120.

As indicated above, the valving surface 116 of the upper valve member 112 slidably engages the valve seat 118 formed in the upper end of the partition bore 120 and the valving surface section 140 of the lower valve member slidably engages the valve seat 136 formed at the lower end of the partition bore 120.

If the valve shaft 152 were connected directly to the valve members so as to provide simultaneously timed movement of the upper and lower valve members, extreme care would be required during the manufacturing process and close tolerances would be necessary to maintain the upper and lower ends of the partition bore 120, the decreased diameter bore 150, the upper and lower valve seats 118, 136, 144, the upper and lower valving surfaces 116, 140, 142 concentric with each other so as to prevent binding of the upper and lower valves and/or early deterioration of the seal 154 disposed within the bore 150. Since the tubular extension 124 is integral with the upper valve member, care would also have to be exercised so as to maintain the cap 132 in a concentric relationship with the tubular extension. To maintain such a concentric relationship between the several parts, close tolerances during the manufacturing process must be observed, all of which would substantially add to the cost of manufacturing of such a filtering device.

In order to eliminate the need for such costly manufacturing techniques which require close tolerances, and to eliminate the need for concentric bores between the valve seats 118, 136 and the decreased diameter bore 150, the upper and lower valve members 112, 114 are connected to the valve shaft 152 by means of universal links 170, 172 respectively disposed on opposite ends of the valve shaft 152 and connected respectively to the lower portion of the upper valve member 112 and the upper portion of the lower valve member 114. The lower portion of the upper universal link 170 and the upper portion of the lower universal link 172 are formed integral with the valve shaft 152, while the upper portion of the upper universal link 170 and the lower portion of the lower universal link 172 are formed integral with the valve members 112, 114 respectively.

In operation, the filter element 54 which is to be utilized is connected to the inlet port 42 and outlet port 44 by means of the valve assembly 12. As viewed in FIGS. 1, 3 and 4 the filter element on the right-hand side is illustrated as being connected to a source of pressure fluid for filtering the same. Fluid under pressure enters the inlet port 42, travels radially inward into the upper end of the partition bore 120, axially upward into the valve member 112 through the apertured sections 162, through the curved passageway 122, and into the inlet passage 30 and the upper filtering chamber 26, through the apertured locking member 60 and axially downward into the interior of the filter element 54, radially outward through the walls in a filtering relationship and into the lower section 34, into the outlet passageway 38 and through the valve member 114, axially upward into the lower end of the partition bore 120 and radially outward through the outlet port 44.

When the filter element 54 on the right side of the device, as viewed in FIG. 1, becomes clogged with sediment, the bypass valve assembly 78 is shifted upwardly so as to directly communicate fluid in the upper section 26 (via the passageway 92) with the lower section 34.

To remove filter element 54 so as to clean or replace the same, fluid flow entering the device through the inlet port 42 can be directed to the filter element 54 disposed on the left-hand side of the device, as viewed in FIG. 1, by rotating the handle 130 180° until it abuts the stop member 131. In this manner, the upper valve member 112 and the lower valve member 114 will be respectively connected to the inlet passageway 32 and the outlet passageway 40 of the filter element 54 disposed on the left-hand side of the device, as viewed in FIGS. 1, 5 and 6. Thus, flow entering the filtering device will enter the upper valve member 112 and exit into the inlet passageway 32 and the upper section 28, into the filter element 54 and radially outwardly therethrough into lower section 36 and by means of the outlet passageway 40 and the lower valve member 114, fluid will exit the device through the outlet port 44.

In order to facilitate easy turning of the valve members 112, 114, a pilot valve 180 is disposed within the tubular extension 124. During operation, pressure is exerted against the valve members in such a manner so as to create a fluid sealing relationship between the valving surfaces 116, 140 and their associated seats 118, 136. In order to permit easy rotation of the valve members, it is necessary to balance the pressure on opposite sides of the valve members 112, 114 and this is accomplished by means of the pilot valve 180. The pilot valve 180 comprises an inlet passage 182 having a valve seat 184 formed thereon and an outlet passage 186. The inlet and outlet passages are adapted to fluidly connect the two sections 26, 28. Communication between the two upper sections 26, 28 is selectively controlled by means of a valve member 188 which engages the valve seat 184 to prevent communication between the two passageways 182, 186 and thus the two sections 26, 28. The valve member 188 is moved axially to and from the valve seat by means of a handle 190 extending upwardly through the tubular extension 124 and which is manually controlled by the operator. Thus, when it is desired to switch the valving members 180° by means of the handle 130 so as to direct fluid pressure from one filter element to the other, the pilot valve handle 190 is turned so as to move the valve member 188 upwardly and away from the valve seat 184, thus establishing a direct fluid communication between the sections 26, 28. With a pressure balance across the valve members 112, 114 the pressure seal created between the valve member surfaces and their associated valve seats is eliminated, permitting the operator of the device to easily turn the handle 130 and the valve members 112, 114. When the valve members have been positioned so as to provide proper fluid communication between the inlet and outlet ports 42, 44 and the desired filter element, the pilot valve handle 190 is turned so as to position the valve member 188 into a fluid sealing engagement with the valve seat 186 to thereby prevent further fluid communication between the two filter chambers. Once communication between the two chambers has been closed off the pressure on one side of the valve member associated with the filter chamber connected to the fluid exerts a force against the interior walls of the valve members 112, 114, creating a pressure seal between the two fluid chambers and the device operates in a manner as hereinbefore described.

Having thus described my invention, what is claimed is:

1. A device for providing a duplex fluid path comprising:
   a housing having an inlet port and an outlet port;
   a pair of chambers each having an inlet and an outlet means respectively adapted to be connected to said inlet port and outlet port;
   fluid-treating means disposed in each chamber between its associated inlet and outlet means;
   a partition disposed between said chambers;
   a pair of valve members carried by said partition, one of said valve members being adapted to be shifted from a first position for providing a connection of the inlet port to the inlet means of one of the chambers to a second position for providing a connection of the inlet port to the inlet means of the other of said chambers;
   the other of said valve members being adapted to be shifted from a first position for providing a connection of said outlet port to the outlet means of one of said chambers to a second position for providing a connection of said outlet port to the outlet means of the other of said chambers;
   means for shifting said one valve member from its first position to its second position;
   said partition having a bore extending therethrough, the opposite ends of said partition bore having valving surfaces formed therein, said valve members being disposed in said valving surfaces at the opposite ends of said partition bore for relative movement therewith;
   a rod rotatably mounted in said bore; and
   a pair of universal links carried at the opposite ends of said rod for coupling said rod to each of said valve members for compensating for misalignment between said valve members and their associated valving surfaces, whereby, as said one valve member is shifted from its first position to its second position, said rod shifts said second valve member from its first position to its second position.

2. A device for providing a duplex fluid path as described in claim 1, wherein said fluid treating means comprises a pair of fluid filter elements, one disposed in said one chamber and the other disposed in said other chamber.

3. A device for providing a duplex fluid path as described in claim 1, wherein said partition bore is provided with a pair of recesses formed on opposite ends thereof and in axial alignment therewith, said recesses forming said valving surfaces, one of said valve members being disposed within one of said valving surfaces for relative rotational movement therewith, while the other of said valve members being disposed in the other of said valving surfaces for relative rotational movement therewith, the fluid pressure in said one chamber exerting a force against a portion of said valve members to urge the same into a fluid sealing engagement with their associated valving surface so as to prevent fluid communication between said pair of chambers.

4. A device for providing a duplex fluid path as described in claim 3, including control means for fluidly connecting said one chamber to the other of said chambers whereby the fluid pressure exerted against opposite sides of said valve member is balanced.

5. A device for providing a duplex fluid path as described in claim 3, wherein the means for shifting said one valve member from its first position to its second position comprises a tubular member extending from said one valve member through a second bore and external of said housing; a handle carried by the external portion of said tubular member and extending in a general perpendicular direction therefrom, said tubular member rotating said valve member upon application of a force to said handle.

6. A device for providing a duplex fluid path as described in claim 5, including control means for fluidly connecting said one chamber to said other chamber whereby the fluid pressure exerted against the opposite sides of said one valve member is balanced.

7. A device for providing a duplex fluid path as described in claim 6, wherein said control means for fluidly connecting said chamber comprises first and second passageways disposed in said tubular member and respectively communicating with said chambers; a valve seat disposed between said passageways; a third valve member mounted in said tubular member and adapted to be positioned into and out of engagement with said valve seat to respectively open and close communication between said first and second passageways; and means for positioning said valve member with respect to said valve seat.

8. A device for providing a duplex fluid path comprising:
   a housing having an inlet port and an outlet port;
   a pair of chambers each having an inlet and an outlet means respectively adapted to be connected to said inlet port and outlet port;
   fluid-treating means disposed in each chamber between its associated inlet and outlet means;
   a partition disposed between said chambers, said partition having a bore extending therethrough;
   a pair of valve members carried by said partition, one of said valve members being adapted to be shifted from a first position for providing a connection of the inlet port to the inlet means of one of the chambers to a second position for providing a connection of the inlet port to the inlet means of the other of said chambers;
   the other of said valve members being adapted to be shifted from a first position for providing a connection of said outlet port to the outlet means of one of said chambers to a second position for providing a connection of said outlet port to the outlet means of the other of said chambers;
   means for shifting said one valve member from its first position to its second position comprising a tubular member extending from said one valve member through a second bore and external of said housing;
   a handle carried by the external portion of said tubular member and extending in a general perpendicular direction therefrom, said tubular member rotating said valve member upon application of a force to said handle;
   said partition bore having a pair of recesses formed on opposite ends thereof and in axial alignment therewith, said recesses forming valving surfaces therein, one of said valve members being disposed within one of said valving surfaces for relative rotational movement therewith, while the other of said valve members being disposed in the other of said valving surfaces for relative rotational movement therewith, whereby the fluid pressure in said one chamber exerts a force against a portion of said valve members to urge the same into a fluid-sealing engagement with their associated valving surface so as to prevent fluid communication between said pair of chambers; and
   control means for fluidly connecting said one chamber to said other chamber whereby the fluid pressure exerted against the opposite sides of said one valve member is balanced, said control means comprising first and second passageways disposed in said tubular member and respectively communicating with said chambers;
   a valve seat disposed between said passageways;

a third valve member mounted in said tubular member and adapted to be positioned into and out of engagement with said valve seat to respectively open and close communication between said first and second passageways; and means for positioning said valve member with respect to said valve seat.

9. A device for providing a duplex fluid path as described in claim 8, wherein the diameter of said partition bore is decreased at a point intermediate said pair of valve members, and said universal link means comprises a rod rotatably mounted in said decreased diameter bore, and a pair of universal links attached to the opposite end of said rod for connecting said rod to each of said valve members.

10. A device for providing duplex fluid path assembly as described in claim 9, wherein said fluid-treating means comprises a pair of fluid filter elements, one disposed in one of said chambers, the other disposed in the other of said chambers.

* * * * *